(12) United States Patent
Yeh

(10) Patent No.: US 6,434,156 B1
(45) Date of Patent: Aug. 13, 2002

(54) VIRTUAL SWITCHING FOR INTERCONNECTED NETWORKS

(75) Inventor: Chiang Yeh, Arcadia, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/122,433

(22) Filed: Jul. 24, 1998

(51) Int. Cl.$^7$ ............................................... H04L 12/56
(52) U.S. Cl. ........................ 370/401; 370/409; 370/466
(58) Field of Search ................................ 370/345, 400, 370/401, 465, 463, 466, 409, 395.1, 396, 397, 395.3, 395.31, 395.5, 395.51, 395.52, 395.53, 395.54, 395.6, 469

(56) References Cited

U.S. PATENT DOCUMENTS

| | | | | |
|---|---|---|---|---|
| 5,717,691 A | * | 2/1998 | Dighe et al. | 370/401 |
| 6,069,890 A | * | 5/2000 | White et al. | 370/352 |
| 6,081,530 A | * | 6/2000 | Wiher et al. | 370/395 |
| 6,084,880 A | * | 7/2000 | Bailey et al. | 370/389 |
| 6,151,324 A | * | 11/2000 | Belser et al. | 370/397 |
| 6,188,691 B1 | * | 2/2001 | Barkai et al. | 370/390 |

FOREIGN PATENT DOCUMENTS

| | | |
|---|---|---|
| WO | WO 97 28505 A | 8/1997 |
| WO | WO 97 50276 A | 12/1997 |

OTHER PUBLICATIONS

Alles A.: 'ATM Internetworking', Cisco Systems, May 1995.
Downey T: "Overview of Tag Switching" Electronics Industries Forum, US, New York, NY: IEEE, p. 61–66 XP000751606 Par. 0002!; Fig. 2.
Sultan B: "A Switch–Router Taxonomy" Computer Communications, NL, Elsevier Science Publishers BV, Amsterdam, vol. 21, No. 2, p. 101–110.
Yakov Rekhter, Cisco Systems: "Tag Switching w Architecture" Jun. 19, 1998, retrieved from the Internet: ≦URL:http//www.cisco.com/warp/public/732/tag/tagsw__ov.htm≧.

* cited by examiner

Primary Examiner—Ricky Ngo
(74) Attorney, Agent, or Firm—Blakely Sokoloff Taylor & Zafman LLP

(57) ABSTRACT

An apparatus comprising a first interface capable of sponsoring a first protocol, a first service translation layer converting data formatted in the first protocol into streams, the first service translation layer extracting and appending a first path identifier to the streams, a core responsive to the first service translator for obtaining the streams and determining a second path identifier therefrom, the core transferring the streams according to the second path identifier, a second service translation layer accepting the transferred streams, the second service translation layer converting the transferred streams into data formatted according to a second protocol, and a second interface for asserting the data formatted into the second protocol. A system comprising a virtual omni-user switching (VOSR) network device, a first network coupled to the VOSR, the VOSR accepting data from the first network, and a second network coupled to the VOSR, the VOSR converting the accepted data into a format compatible with the second network, the VOSR capable of switching data among the first and second networks and other networks coupled to the VOSR. A method comprising creating tunnel segments in a public network supplied data pipe, maintaining a tunnel mapping in private networks bridged by the data pipe, and switching data between devices in one of the private networks with devices in another of the private networks bridged by the data pipe, the tunnel mapping determining the switching, the switching performed over the data pipe in the tunnels in a fashion transparent to the public network.

18 Claims, 7 Drawing Sheets

VIRTUAL SWITCHING FOR INTERCONNECTED NETWORKS

BACKGROUND OF THE INVENTION

1. Field of the Invention

The invention relates generally to computer networking. More specifically, the invention relates to switching, routing and bridging devices for interconnecting networks and other devices.

2. Description of the Related Art

One way of subdividing communications networking environments and protocols is to classify them as either connection-oriented or connectionless. In connectionless environment or protocol, the source and destination address is specified for each "packet" or unit of data such that the network resolves these addresses to determine a route for the packets to travel in. The IP or Internet Protocol is an example of a connectionless service. By contrast, in a connection-oriented environment, a source and destination set-up or establish a routing or connection that does not change from packet to packet. One example of a connection-oriented service is the PSTN (Public Switched Telephone Network) where one phone sets up a call to another phone and establishes a permanent circuit wherein voice data can travel back and forth.

Another way to classify networks is based upon their speed in transferring data and the geographical or physical range of the data transfer. Generally, in this classification, networks may be considered LANs (Local Area Networks) or WANs (Wide Area Networks). LANs are usually limited in geographical range (for instance, an office building) whereas WANs may span over hundreds of miles such between offices located in different cities. LANs and WANs may be either connection-oriented or connectionless. When WANs and LANs are connected to other LANs and WANs using different protocols special network devices known as gateways (or routers) are needed so that information can travel between them.

Typically these network devices are hardware mechanisms that can provide physical connectivity translation (e.g., between Ethernet and fiber) and/or protocol translation (e.g., between IPX and IP (Internet Protocol). With the proper design and programming of such network devices potentially any type of networks can be interconnected. When more than two networks or network devices are attached at some common interconnect, such as a frame relay cloud, devices known as switches regulate the passage of data from one network device to another.

Where a network device also needs to switch because different data have different destinations after passing through the device, switching and routing functions may need to be combined. Though switching and routing functions have often been combined by placing switching software/hardware within a network device, one problem from a customer standpoint is the disposition of legacy devices already present in the customer's network which may function well for their purpose and do not warrant an expensive replacement upgrade. Since such legacy devices may not be able to be programmed or retrofitted to provide a new function such as switching, to utilize legacy devices, switches are often added to a common connection point (such as a leased line) as separate hardware components. In a connection-oriented environment such as frame relay, this often implies that the "carrier" or provider of the physical line for the network must provide a separate additional line for the new network device. Though "virtual circuits" (VCs) may be provided by the carrier, these are only obtained at substantial cost and ordinarily not controlled or configurable by the customer. When the number of network devices grows, the cost becomes prohibitive since each additional carrier line is accompanied by monthly charges as well as maintenance.

Where physically separate switching hardware is used to interconnect two or more dissimilar network devices to another network, the hardware is often too expensive or cumbersome for the task at hand. For instance, most switches are built with a large number of ports, typically 16, and thus are under-utilized where only a handful of network devices may need to be connected. Where the switching hardware is plugged in (for instance, by means of a chipset) to a network device, this integration is typically provided on the backplane of the router device and thus will conform to the protocol or standard of the backplane, for instance ATM (Asynchronous Transfer Mode) and be incapable of providing a translation between dissimilar protocols that may later need interconnection.

Where software switching is provided for the router, the software switch is typically not configurable once installed in the sense that it is typically not capable of peer-to-peer connectivity. For instance, since a router is designed to move data to a pre-specified network cloud to which it is connected, when two or more network devices are interconnected for moving data to that pre-specified network, they are then unable to move data directly between each other. In order to do communicate with one another, they must move their data first "up" to that pre-specified network after which the pre-specified network moves the data back "down" to the other router. This problem is often stated as an inability of "users" of the same level (such as two routers) to directly communicate in a peer-to-peer fashion without passing first through an "upper user" (such as the pre-specified network). This scheme is very expensive in every facet since the latency, load upon the network and connection cost is increased while speed, reachability and even security may be decreased.

Thus, there is a need for virtual switching scheme that permits any network devices at any level in a network topology to communicate with each other directly without resorting to re-routing upstream and downstream when such routing is extraneous. Additionally, there is a need for a inexpensive switching solution that does not involve proprietary protocol recognition or hardware implementation.

SUMMARY OF THE INVENTION

What is disclosed is an apparatus comprising a first interface capable of sponsoring a first protocol, a first service translation layer converting data formatted in the first protocol into streams, the first service translation layer extracting and appending a first path identifier to the streams, a core responsive to the first service translator for obtaining the streams and determining a second path identifier therefrom, the core transferring the streams according to the second path identifier, a second service translation layer accepting the transferred streams, the second service translation layer converting the transferred streams into data formatted according to a second protocol, and a second interface for asserting the data formatted into the second protocol.

Also disclosed is a method comprising converting data formatted in first protocol into streams, uplinking the streams to a core module, the streams accompanied by a path identifier, transferring by the core of the streams to a destination in accordance with the path identifier, converting at the destination the streams into data formatted in a second protocol, and issuing the data formatted in the second protocol.

Also disclosed is a system comprising a virtual omni-user switching (VOSR) network device, a first network coupled to the VOSR, the VOSR accepting data from the first network, and a second network coupled to the VOSR, the VOSR converting the accepted data into a format compatible with the second network, the VOSR capable of switching data among the first and second networks and other networks coupled to the VOSR.

Also disclosed is a method comprising creating tunnel segments in a public network supplied data pipe, maintaining a tunnel mapping in private networks bridged by the data pipe, and switching data between devices in one of the private networks with devices in another of the private networks bridged by the data pipe, the tunnel mapping determining the switching, the switching performed over the data pipe in the tunnels in a fashion transparent to the public network.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1A:
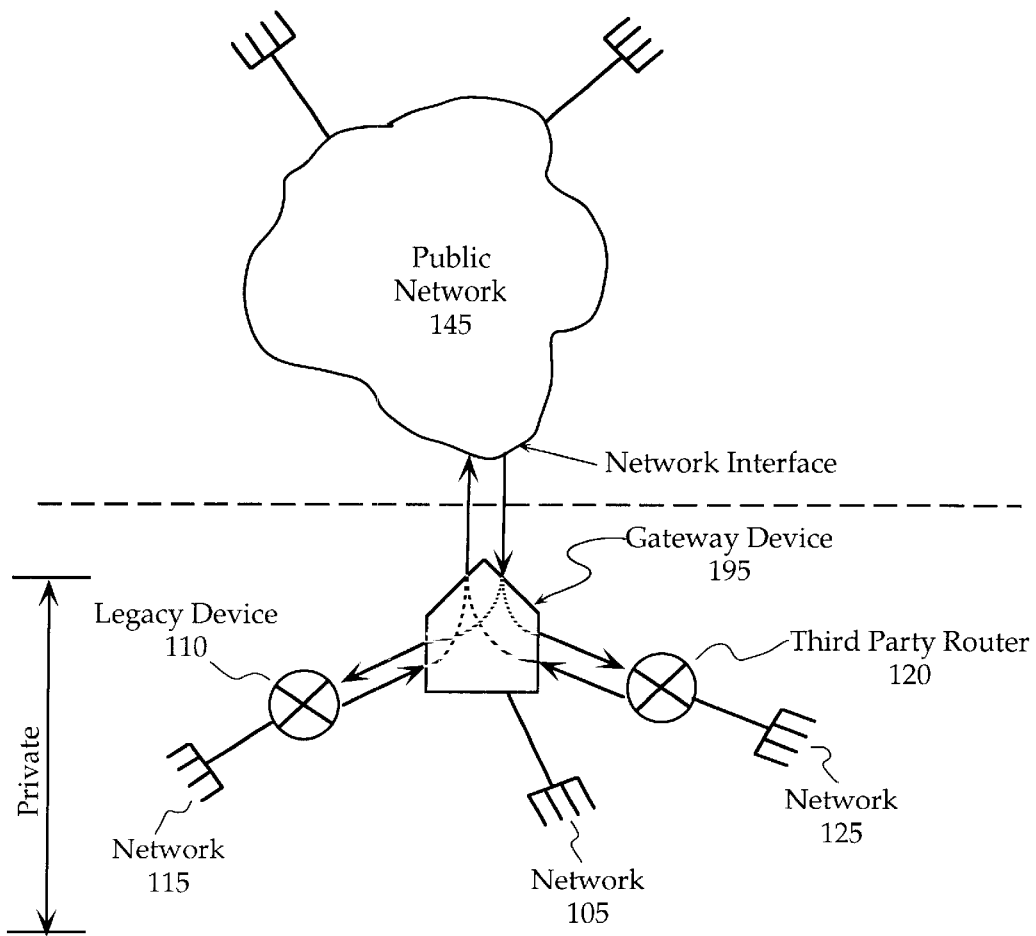
FIG. 1(a) provides an overview of conventional network interconnections.
Figure 1B:
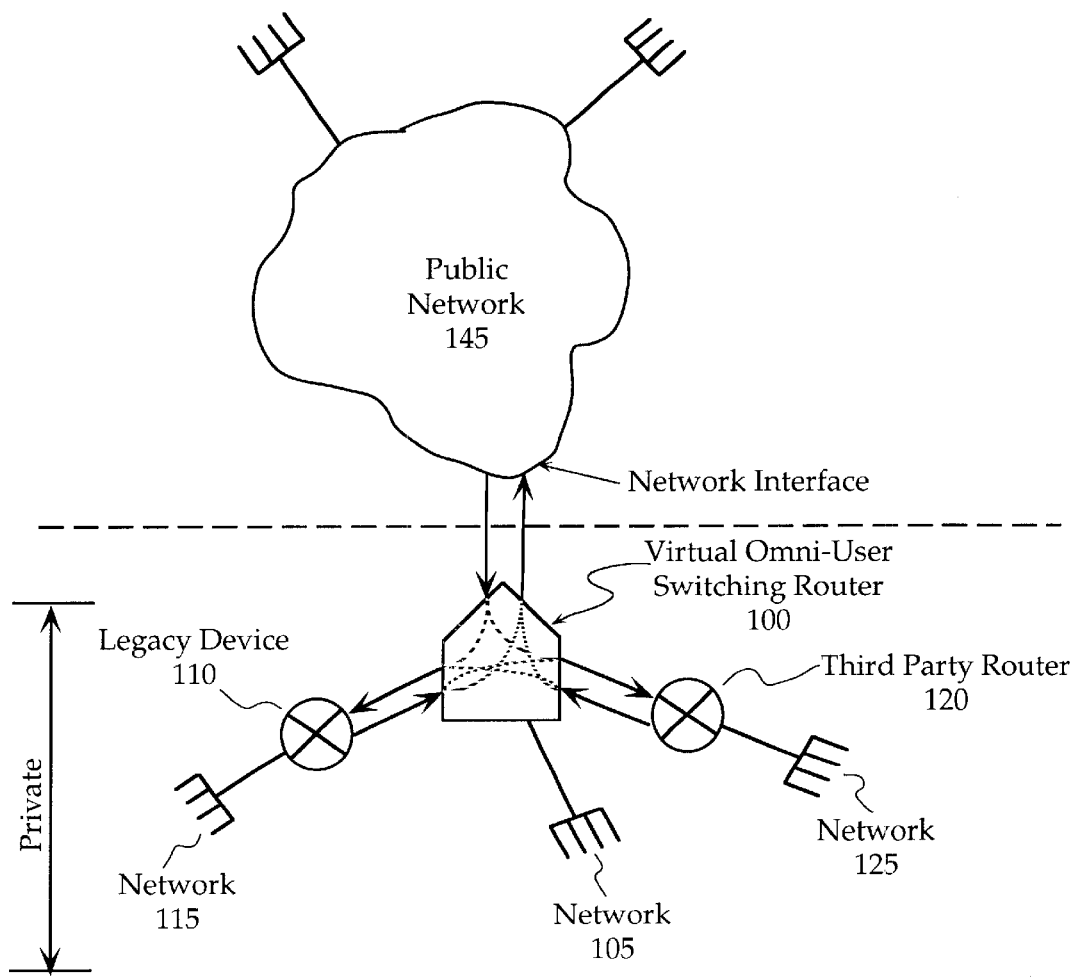
FIG. 1(b) provides an overview of the disclosed embodiments of the invention.

FIGS. 1(a) and 1(b) show a Network 145 which is a carrier provided network segment such as a frame relay "cloud." "Private" users, those in the same physical location, such as an office building may connect to other office buildings through a network cloud such as network 145. Network 145 can connect other private networks (not shown) to the private users shown in FIGS. 1(a) and 1(b). The private users shown in FIGS. 1(a) and 1(b) may consist of other networks, such as networks 105, 115, and 125 connected to other routers, such as routers 100, 110 and 120.

Referring to FIG. 1(a), which provides an overview of conventional network interconnections, typically when a legacy device 110 such as router attempted to connect to a frame relay based network such as network 145, where that router did not support frame relay signaling, another gateway or translationing device 195 was required to act as a translator between the two. Such routers are ordinarily designed to provide "upstream" communication capability (where a private user sends data to the public network) and "downstream" capability (where a private user receives data from the public network). This capability is split in that the gateway router provides upstream/downstream capability to the existing router and then uses its upstream/downstream capability with the public network to facilitate the data transfer. The preservation of legacy device such as legacy device 110 is often important where for example, a LAN of an office (such as network 115) has a different backbone and protocol (such as IP) which it needs to maintain for private users within network 115. In such a scenario, however, the gateway device 195 may also sponsor its own private network (such as network 105). This private network is not enabled to communicate directly with the network sponsored by the legacy device unless the public network is first involved in the transfer. This inefficiency places an undue burden on the public network as well as on the gateway device 195. An additional standalone switch faces the same problem in that the switching is designed to orient traffic toward the public network and not the gateway and can be quite cost-inefficient when setting up to bridge the legacy device 110 and the gateway device 195. Also, a problem lies in the switch being unable to translate between protocol differences among private networks and their nodes, necessitating the use of another gateway as well for each desired protocol translation.

FIG. 1(b) provides an overview of the disclosed embodiments of the invention.

According to an embodiment of the invention, a Virtual Omni-User Switching Router (VOSR) 100 is provided to perform a variety of services in a configurable manner, the primary of which is peer-to-peer or private node to other private node direct interconnect switching. VOSR acts as an ordinary router with a frame relay (or other public network compatible) port and can sponsor its own network 105 as shown in FIG. 1(a). VOSR 100 is also a switching device which facilitates data transfer from private nodes on network 105 to private nodes on other networks such as network 115 without resorting to re-routing of the data through the public network 145. Importantly, the VOSR 100, according an embodiment of the invention, provides service translation that permits VOSR 100 to interface and communicate with a third party router 120 which may not be compatible with either the public network compatible protocol native to the VOSR 100 (such as frame relay) or the protocol native to the legacy device 110. VOSR 100 can be programmed to translate between a service/protocol compatible with third party router 120 and any other service/protocol such that any node of a network 125 sponsored by third party router 120 can communicate directly with nodes of other private networks such as network 115 or network 105. VOSR 100 also provides tunneling over the public network 145 to destination beyond without permission of and in a transparent fashion to the public network 145 and segmentation which is unavailable with conventional routers.

Figure 2:
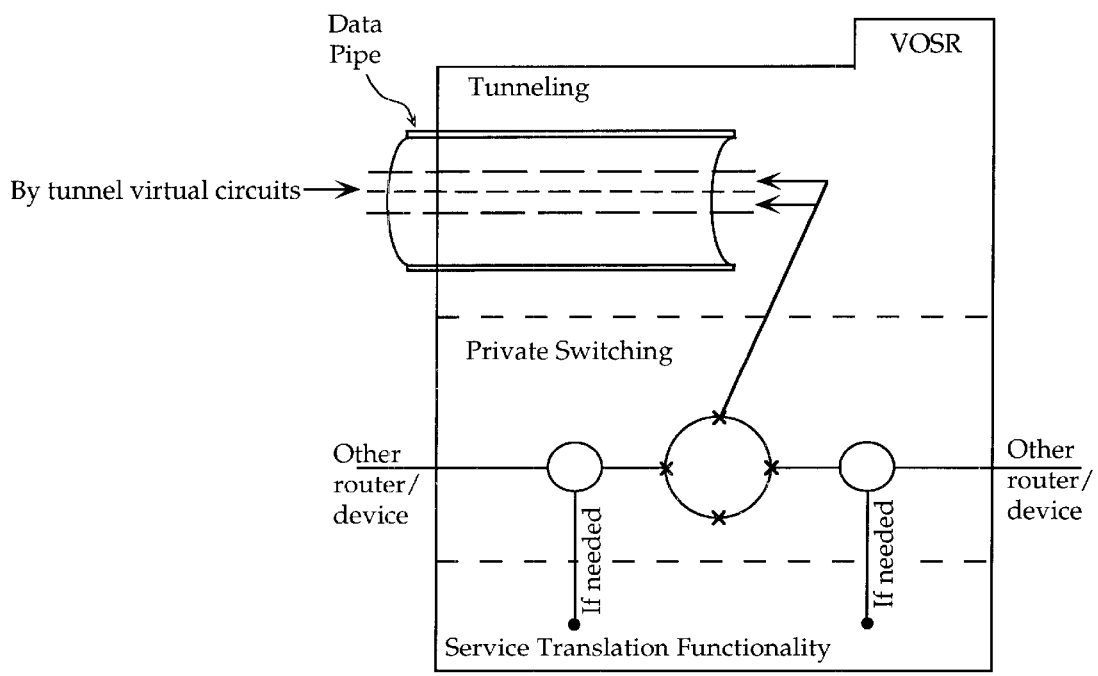
FIG. 2 shows the functionality of a VOSR according to an embodiment of the invention.

FIG. 2 shows the functionality of a VOSR according to an embodiment of the invention.

A VOSR, according to an embodiment of the invention, may have traditional hardware-based router elements such as ports needed to connect out to a public network. Advantageously, and unlike traditional routers, a virtual switching capability is provided with the VOSR such that direct communication is facilitated between other routers, nodes or devices that are private without any re-routing upstream through and downstream back from the public network which would ordinarily have the desired switching capability. The virtual switch operating within the VOSR maintains a database that stores (and, if needed, updates) two parameters-a path identifier (ID) and port ID for each "virtual circuit" (VC) created between two private nodes that are communicating through the VOSR. The port ID identifies an interface between a switching "core" and a service translation layer, while the path ID identifies ingress and egress points within the switching core (see FIG. 4 and associated description). Virtual switching is typically concerned only with switching regulation for nodes on private networks sponsored by private routers connected to the VOSR. Any number of VCs may be created and maintained by the VOSR, such that an arbitrary number of private routers/devices (such as the legacy devices and third party routers shown in FIG. 1) may be connected and given a data transfer pathway without resorting to the public network. Unlike a physical switch which is inherently limited in the number as well as the type of devices it can interconnect, the VOSR adds a new database entry or set of entries for any new VC or router/device needing switching services.

For each VC, there may be an incompatibility between the nodes that are trying to communicate, particularly, when the routers sponsoring the networks on which they lie are incompatible. For instance, referring back to FIG. 1(a), if the third party router 120 natively sponsors an IP-based network, which is connectionless and packet oriented, while the existing router sponsors an X.25 based network, which is connection oriented and circuit based, then without some translationing, nodes on one network will be unable to communicate with nodes of the other. A traditional physical switch does not act to translate between services/protocols since its function is to switch rather than to interpret. Further, once designed, such switches cannot be easily modified to accommodate new services/protocols or existing protocol changes that may need support. Thus according to another embodiment of the invention, the VOSR also incorporates service translation layers which act as translationing gateways facilitating the transfer of data between nodes on incompatible networks. The service translation layers perform task such as encapsulating and de-encapsulating of headers for different types of datagrams such as those defined by the well-known TCP (Transport Control Protocol) and UDP (User Datagram Protocol). This built-in translation capability eliminates the need for any gateways or translationing hardware.

Another feature of the VOSR is the ability to provide tunneling and bandwidth segmentation. When a single physical pipe such as an Ethernet connection is used as a data transfer pathway, the total bandwidth or capacity of the pipe to transmit information may be segmented. In the typical router or switch, such tunneling if offered is proprietary such that the tunneling protocol used may not be understood by a router of another manufacturer. This prevents a traditional router or switch from setting up tunnels between devices of arbitrary nature.

Figure 3:
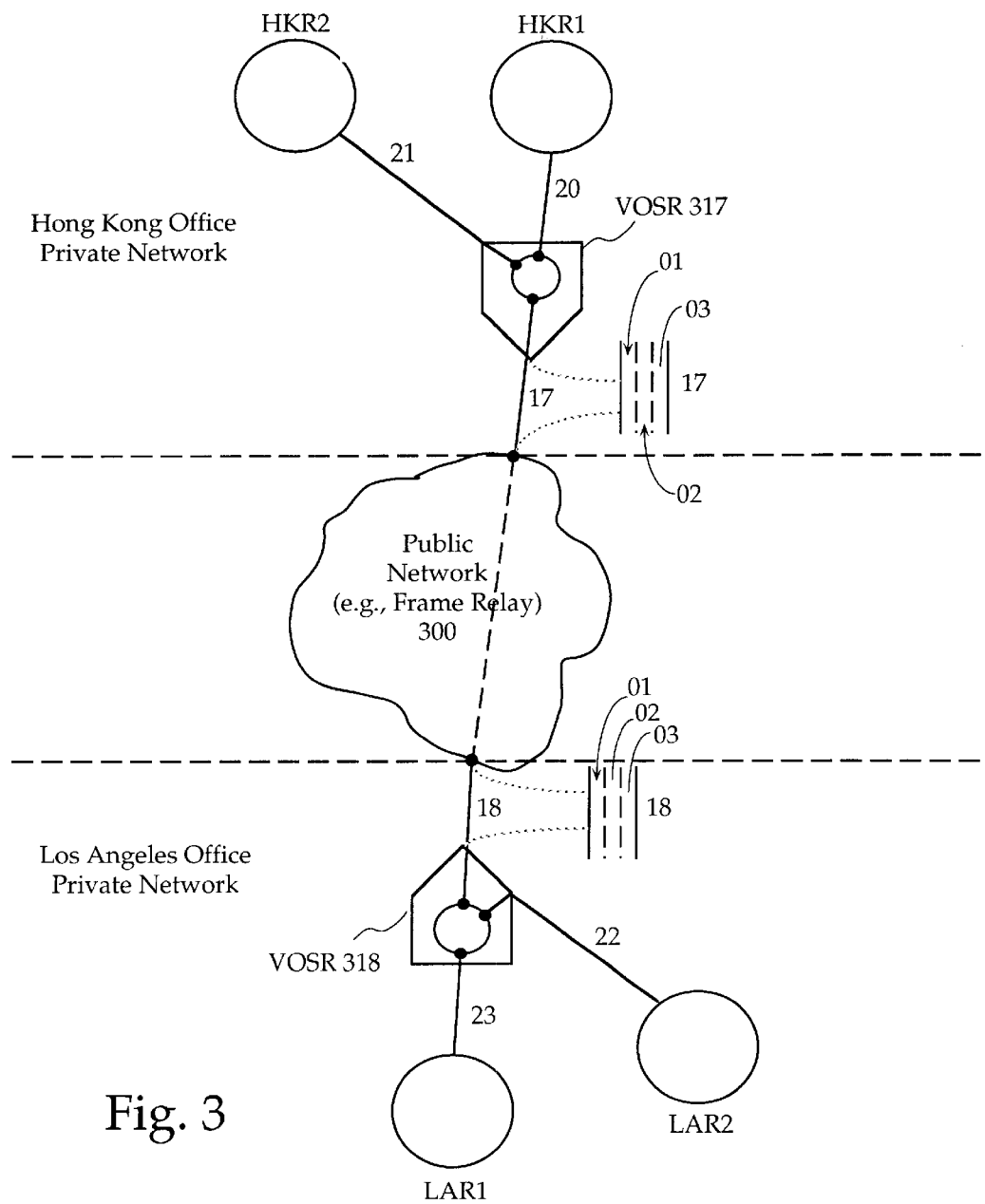
FIG. 3 describes tunneling according to an embodiment of the invention.

FIG. 3 describes tunneling according to an embodiment of the invention.

FIG. 3 shows tunneling capability implemented in a VOSR that sponsors a frame relay network. A public network 300 such as a frame relay network can bridge together two private networks in a wide area, as exemplified in FIG. 3. For example, an office in Hong Kong may be connected over the public network 300 to an office in Los Angeles. Typically, the carrier hosting the pubic network 300 "leases" one physical line (data pipe) (lines 17 and 18) into each office, and directs data traffic within the public network so that two offices are connected in a direct fashion.

The Los Angeles office is shown in FIG. 3 to have two routers LAR1 and LAR2, and according to an embodiment of the invention, these are connected to a VOSR 318. VOSR 318 interfaces with the public network 300 which provides the Los Angeles a frame relay leased line data pipe assigning it an ID of 18. This ID is assigned by the carrier and not subject to modification by the private network. If a more than one virtual circuit is desired, then the carrier leasing the line, must provide the VC identification according to conventional router design. Alternatively, the carrier may force the customer to buy a separate leased line for each new tunnel or virtual circuit that is desired between the two offices. Either alternative may be expensive since the third party carrier, not the customer, has provisioning control of the public network.

However, with the addition of a tunneling capability such as that provided in VOSR 318, the tunneling and virtual circuit numbers may be assigned and maintained privately. The so-called "tunnel mapping" is internal to the private offices and transparent to the public network. This eliminates the potential cost of a separate leased line or a public network assigned numbering which is not configurable. In order to achieve private tunnel-mapping, a VOSR 317 in the Hong Kong office is also utilized which interconnects a leased line designated as 17 by the carrier of the public network with two routers HKR1 and HKR2. VOSR 317 includes much of the same functionality as its Los Angeles counterpart VOSR 317, particularly as pertains to tunnel-mapping. Each VOSR 317 and 318 maintains a table of tunnel mappings that in combination permit the simultaneous use of the single pair of leased lines 17 and 18 by more than one of the private router LAR1, LAR2, HKR1 and HKR2.

A tunnel mapping table would be used to essentially assign a sub-circuit by means of the path ID for each tunnel created in the carrier supplied line that needs to be segmented. For instance, the carrier supplied data transfer line 17 may be virtually divided into three segments labeled 01, 02 and 03. Each segment could be assigned to the traffic of a particular private router. If the connection between VOSR 317 and HKR2 is labeled 21 and the connect between VOSR 17 and HKR1 is labeled 20, then VOSR 317 may maintain a table such as:

17:01→21
17:02→20
17:03→21

In the above table, line 21 (and thus HKR2) participates in two virtual circuits or tunnels 17:01 and 17:03. This may be needed where HKR2 needs to communicate simultaneously or contemporaneously with two routers in the Los Angeles office, LAR1 and LAR2. If HKR1 also needs to communicate with two other routers, another tunnel segment may be created by simply adding an entry 17:04→20 to the mapping table of VOSR 317. For VOSR 317, it is not relevant what the final path or destination end of the tunnel segment is, since this is left to the other VOSR 318 which also maintains a mapping table relevant to the LA network. Assuming that the connect between VOSR 318 and LAR1 is labeled 23 and the connect between VOSR 318 and LAR2 is labeled 22 then a tunnel mapping table for VOSR 318 may be the following:

18:01→22
18:02→23
18:03→23

For the Los Angeles office, line 23 (between VOSR 318 and LAR1) defines two tunnel segments, 18:02 and 18:03 and thus, can have two different and simultaneous connects with private routers in the Hong Kong office or elsewhere. The tunnel segment numbering 01, 02 and 03 operates as a switching fabric since it identifies the same data transfer path on both carrier lines 17 and 18. Thus, 17:01 is the counterpart of 18:01, 17:02 the counterpart of 18:02 and 17:03 the counterpart of 18:03. Thus, a virtual circuit can be considered created between 21 (and thus HKR2) and 22 (and thus LAR2) through the tunnel segment 01, which is identified by VOSR 317 as 17:01 and by VOSR 18:01. In order to achieve tunneling in this manner, the VOSR 317 and VOSR 318 should preferably handshake and negotiate the tunnel ID which it then uses locally. This negotiation is performed without permission of the carrier sponsoring the lines 17 and 18 through which the tunnel is created since leased line relationships remain unchanged. Referring to both aforementioned tables, tunnel segment 02 interconnects 20 with 23 (HKR1 with LAR1) over the public network while tunnel segment 03 interconnects 21 with 23 (HKR2 with LAR2). Whenever new nodes, routers or devices request a connection, new table entries may be created ad infinitum, restricted only by the memory available for the mapping table as will be appreciated by those ordinarily skilled in the art.

By circumventing the need for the public network (and thus the carrier) to assign virtual circuit numbers, the configuration of the entire WAN is more flexible (since it is privately regulated) and the cost is internalized as carriers often charge for each additional VC created. Also this scheme avoids the situation where carriers do not or are unwilling to provide tunneling and VCs, and thus require the use of a separate physical line, which is expensive both in terms of cost and perhaps maintenance and overhead since another router may be needed to connect the second line.

The tunneling functionality of the VOSR 317 and 318 is in addition to the switching and service translation layer functions that may need to implemented so that VCs are created between routers LAR1 and LAR2, for example. The tunnel mapping is akin to and can be combined within the switching table, described below in reference to FIG. 4.

Figure 4:
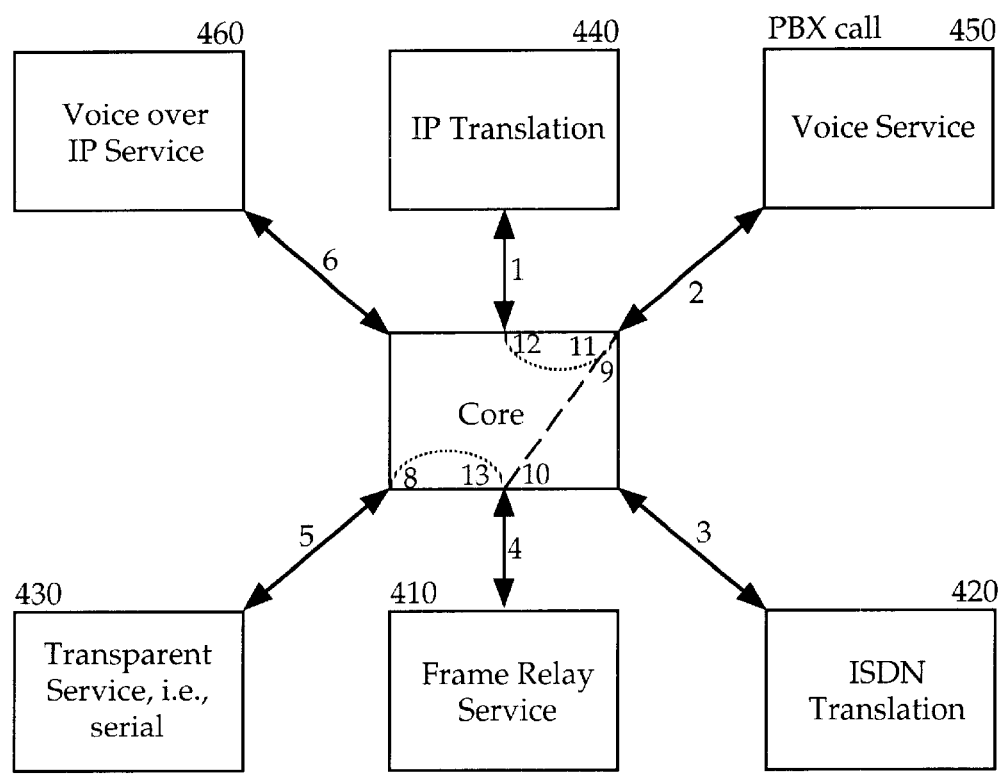
FIG. 4 illustrates the stacking of functions and assigning of IDs within the VOSR.

FIG. 4 illustrates the stacking of functions and assigning of IDs within the VOSR.

FIG. 4 illustrates the logical framework of an exemplary VOSR. One layer of functionality is a frame relay service 410 which provides the VOSR with the capability of interpreting frame relay headers and the packets they encapsulate. Frame relay service 410 is similar to a frame relay service of a typical frame relay router except that it is also "streams compliant" in accordance with an embodiment of the invention. One key feature of the invention involves conversion of circuit or packet data into "streams." Streams are well-known in the art of computer programming, and are defined in the standard reference, "UNIX System V Release IV Programmer's Guide: Streams" (published by Prentice Hall, 1991), and also "UNIX System V/306 Streams Primer," (Prentice Hall, 1991), both authored by AT&T Corporation (collectively referred to hereinafter as "streams specification"). Thus each of functional modules shown in FIG. 4 should also be streams compliant in accordance with the invention. A core function 400, which implements the virtual circuit switching is software or programmable hardware based such that it can be easily configured and also is streams compliant.

The VOSR can provide service translation layers that convert/translate one type of protocol or service to another. In providing service translation, the VOSR is capable of interconnecting a great variety of disparate network and data types such that the flow of information in a network of networks does not require hardware complexity. For instance, a voice service 450 may be used to accept a PBX-type voice call at the VOSR. Voice service 450 is also streams compliant, and thus, will convert the voice data into data streams. A "put" streams operation will uplink the voice data as streams to the core 400, which is also streams compliant. The put operation will accompanied by an additional pair of parameters, namely, a port ID and path ID such that core 400 will recognize which destination the data is bound for. Based on the destination, a variety of different layers may be invoked. For instance, if the voice data from the PBX desires to transfer its voice data to an IP-based device that is also connected to the VOSR, a "put" (or "putqueue") is performed on the stream(s) to uplink it to an IP translation service 440. IP translation service 440 is also streams compliant and thus accepts the stream of data and encapsulates and/or converts to the voice data to IP packets in a known manner. Once the IP translation service 440 has encapsulated the voice data stream into an IP packet, the data may then be sent directly to an IP-network based device or issued to a network implementing such devices.

Likewise, a voice call may be switched through core 400 to frame relay service 410 such that the data is available to devices sponsored by the frame relay network. Again the voice call is transformed into streams when received by voice service 450, and the "put" to core 400. Core 400 initiates another "put" to frame relay service 410 which is also streams compliant and will convert the stream into a frame relay data format suitable for transmission over a frame relay network. In the same manner, the voice "stream" put from voice service 450 may be switched to a transparent service such as serial which will also be streams conformant, and convert the data stream and buffer it in a serial manner such that a serial device (not shown) may directly receive it.

As described earlier, the VOSR maintains a switching table which identifies virtual circuits created between various service translation layers and contains a combination of a path ID and port ID for each. FIG. 4 shows port IDs between each of the service translation layers and core 400. For instance, port ID 2 identifies a stream(s) between PBX voice service 450 and core 400. Likewise, port ID 1 specifies stream(s) between IP translation service 440 and core 400, port ID 3 specifies streams between ISDN service 420 and core 400, port ID 4 A specifies stream between frame relay service 410 and core 400, port ID 5 between serial service 430 and core 400 and port ID 6 between voice over IP service 460 and core 400. These port IDs number each stream uniquely but do not relate the destination or path. The port IDs may be fixed/assigned when the translation service layer is programmed, or when the VOSR is activated through a handshaking between core 400 and that service translation layer.

A path ID is a single number which identifies an ingress point from a service translation layer while another path ID may identify an egress point to a service translation layer. For instance, in the example above of a purported transfer of voice data to a frame relay, the ingress point to the core from port ID 2 is identified as 9. The egress point from the core to the frame relay service 410 is identified as 10. The combination of path IDs 9 and 10 define a virtual circuit between voice service 450 and frame relay service 410 (i.e., port or streams 2 and 4). Both ingress and egress points need to be identified since any service may be interconnected to any other service. To maintain such flexibility, and to remove core 400 from being unable to decide what the intended destination of the streams are, the ingress and egress points are defined. Each service translation layer must provide a path ID to the core 400 when the first data stream in a virtual circuit is sought to be transferred. After that, a switching table may be maintained within the core such upon receiving the path ID from the service putting the stream to the core, the virtual circuit and destination can be referenced in the table. A virtual circuit between ports identified and 2 have an ingress/egress pair 11 and 12. By specifying two path IDs, the switching is full duplex or bi-directional once a virtual circuit is established. A table for the exemplary virtual circuits shown in FIG. 4 may be summarized as follows:

|  | Port/Path | Port/Path |
|---|---|---|
| Voice ←→ Frame Relay | 2/9 | 4/10 |
| Voice ←→ IP | 2/11 | 1/12 |
| Frame Relay ←→ Serial | 4/13 | 5/8 |
| . | . | . |
| . | . | . |
| . | . | . |

In like fashion, any type/origin of data, can be switched to any other similar or disparate protocol or network service by use of the appropriate translation layer. The exemplary model shown in FIG. 4 would allow any the following data transfers: Voice to Frame Relay, ISDN or Serial; Frame Relay to Serial, Voice, or ISDN; ISDN to Frame Relay, Serial or Voice; and Serial to Frame Relay, Voice or ISDN. The universal requirement, according to an embodiment of the invention, is that each module in the VOSR be streams compliant such that it can receive a stream and if needed, perform a put or putqueue to uplink the data to another module. The modules shown in FIG. 4 are merely exemplary. Any number and variety of other services may be added/programmed into the VOSR such that each of the already existing services can now communicate with it to transfer data to that new network/device type. One example of a service not shown is IPX which may be added into the VOSR to achieve interconnectivity through the VOSR with an IP network in a known manner. Such flexibility is enabled in part by the requirement, according to an embodiment of the invention, that the IPX service translation layer that is added also conform or be compliant with the streams standard. The core 400 is essentially a switch with a translationing capability, and each service shown connected to it behaves much like a DTE (Data Terminal Equipment) device. Thus, the VOSR may be viewed as a plurality of translationing devices that are plugged into a switch. According to an embodiment of the invention, each module shown in FIG. 4, including the core 400 is software or some programmable device, such that the switch and those service translations layers plugged into the switch are all implemented in software or programmable hardware. A tunneling service layer may also be provided separately to maintain the mapping between the VOSR shown in FIG. 4 and other VOSRs connected over a public network. Part of the VOSR not shown is the physical interconnects that allow each of these connections to other physical routers or networks to be maintained such as those found in conventional router.

Unlike a conventional router, switching and tunneling are both performed and unlike a conventional router or network device, by simply programming a new service translation module, the VOSR can interconnect any new network/protocol/data type that needs interconnection. One of ordinary skill in the art will readily be able to implement the encapsulation/de-encapsulation performed in the service layers shown in FIG. 4.

Figure 5:
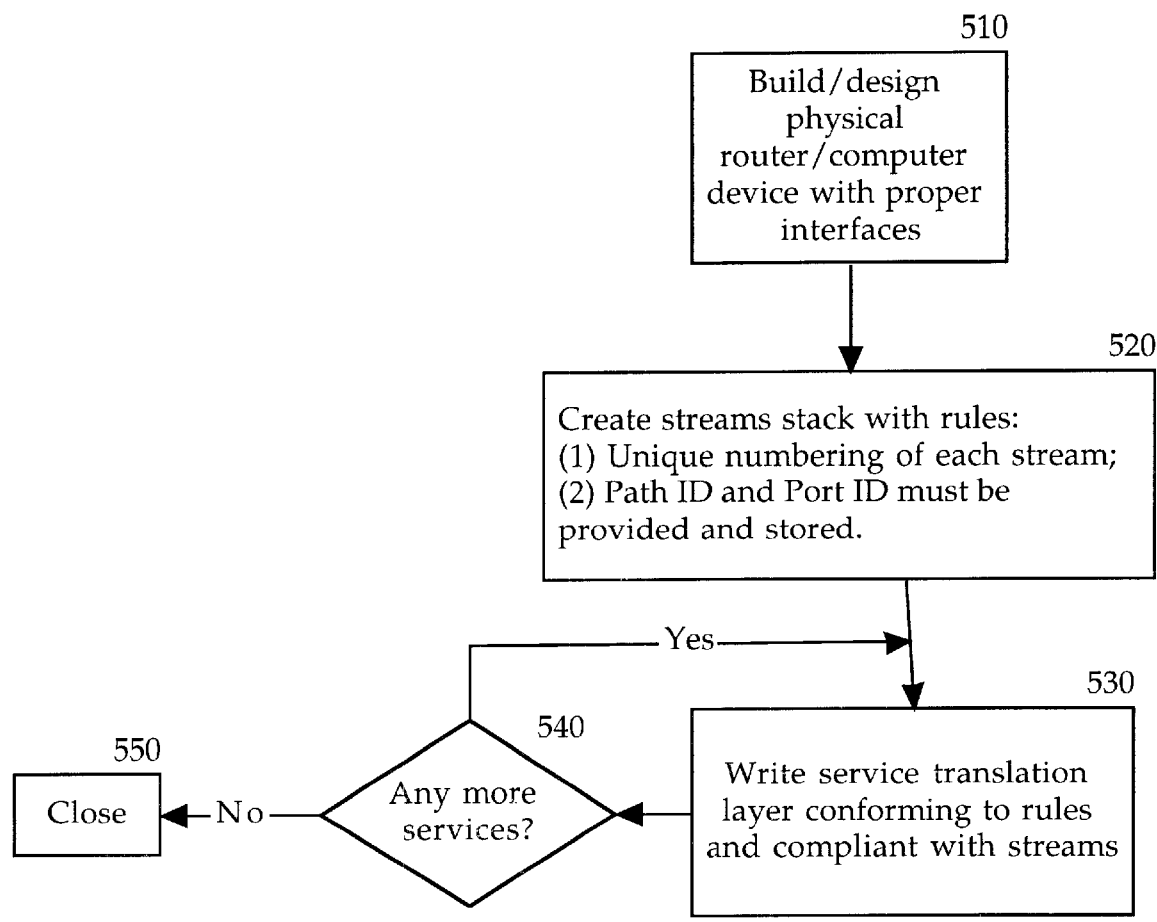
FIG. 5 shows a design methodology for configuring a VOSR according to an embodiment of the invention.

FIG. 5 shows a design methodology for configuring a VOSR according to an embodiment of the invention.

The first step in configuring a VOSR is to build/design the physical router device with the appropriate interfaces (step 510). Such techniques for building a physical router, such as a frame relay router are known in the art and need not be discussed further herein. Once the physical router is built and/or designed, then according to step 520, a streams stack is created with two rules: (1) Each stream must be uniquely numbered; and (2) A path ID and port ID must be provided by each module when performing a "put" of data to other modules. When these two rules are enforced, a VOSR is able to provide a combination of virtual switching, service translation and tunneling. Thus, when configuring the VOSR, the next step is to write service translation layer modules which conform to the above rules and which comply with the streams specification (step 530). If any more services need to be enabled (checked at step 540), then more service translation layers are programmed in or written to the VOSR in accordance with step 530. Once all services that need enabling are finished, the VOSR is closed (step 550) and ready to commence operation. After the initial design whenever a new service needs enabling, step 530 can again be repeated such that the new service is enabled. This allows the VOSR to dynamically expand its range of capabilities, limited only by the availability of resource necessary to program the VOSR. In an alternate embodiment, a computer system may be used as VOSR, provided that it has whatever capability of physical interconnect/interface (e.g., Network Interface Card) that would be needed to transfer data. The VOSR, in the disclosed embodiments of the invention, may couple a computer subsystem such as a processor and memory within a physical router to achieve the desired programmability.

Figure 6:
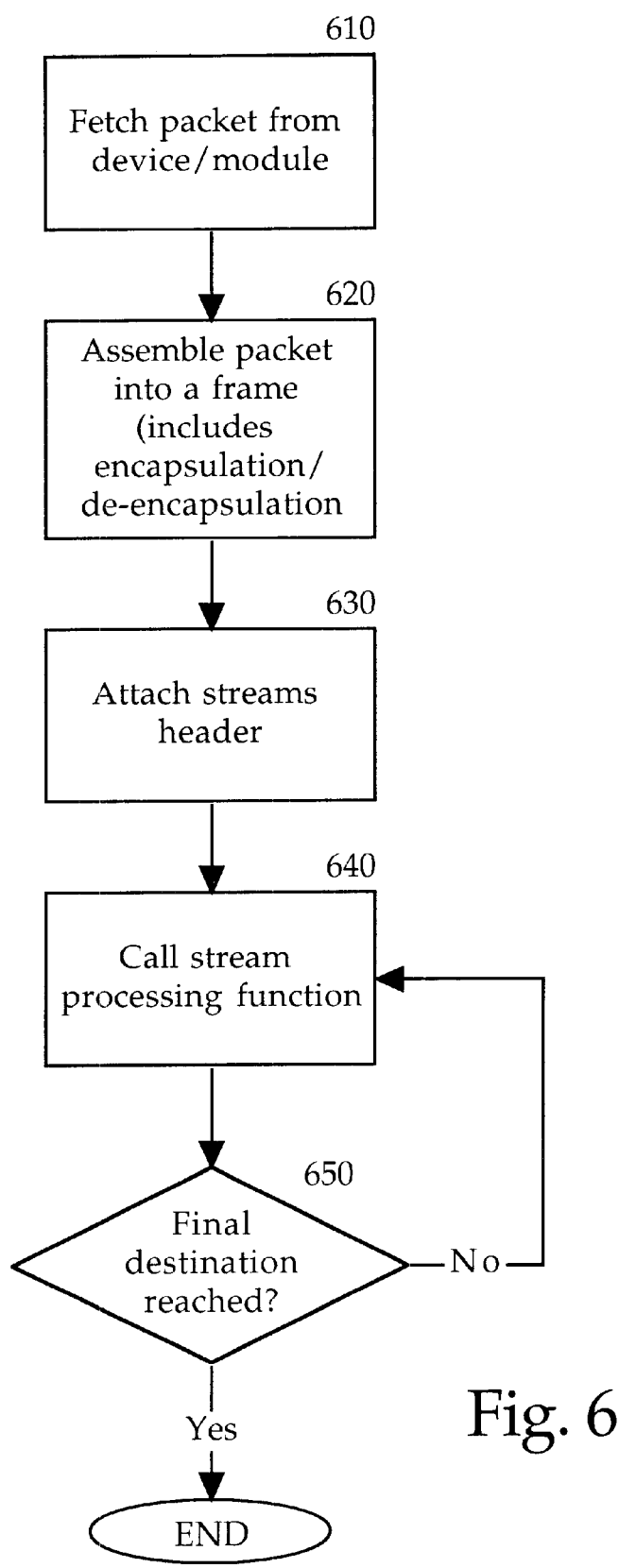
FIG. 6 is a flow diagram of processing data packets into data streams in accordance with the disclosed embodiments of the invention.

FIG. 6 is a flow diagram of processing data packets into data streams in accordance with the disclosed embodiments of the invention.

Each module within the VOSR must convert data packets into data streams so that the information within the data packets may be passed from module to module within the VOSR. FIG. 6 illustrates one methodology for performing the data packet to data stream conversion within these modules. The first step in doing so is to fetch the data packet from the device/module (step 610). The VOSR may include traffic management layers that coordinate and/or queue the movement of data between devices outside the VOSR and modules within the VOSR. Once a packet is fetched, the data is assembled into a "frame" (step 620). A frame is defined in the streams specification and is essentially a unit of data with complete header information and data payload without fragmentation. The frame is then encapsulated by attaching a streams header (step 630), which is defined in the streams specification, of the proposed data transfer. With the appropriate streams header, a streams processing function such as "put" or "putqueue" may be called (step 640) in order to initiate the movement of the data stream to the next module/device. If the final destination for the data is not yet reached (checked at step 650), then the streams processing of the stream repeats. If the final destination is reached the proper encapsulation, provided by the service translation layer above will already accompany the data making it suitable for transfer. For instance, referring back to FIG. 4, streams data which is uplinked to IP translation service 440 will be encapsulated into IP after the stream is received.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. An apparatus comprising:

first interface capable of sponsoring a first protocol;

a first service translation layer converting data formatted in said first protocol into streams, said first service translation layer extracting and appending a first path identifier to said streams;

a core responsive to said first service translator layer for obtaining said streams and determining a second path identifier therefrom, said core transferring said streams according to said second path identifier;

a second service translation layer accepting said transferred streams, said second service translation layer converting said transferred streams into data formatted according to a second protocol; and a second interface for asserting said data formatted into said second protocol.

2. An apparatus according to claim 1 wherein said first protocol and said second protocol are different.

3. An apparatus according to claim 1 wherein said first and second protocols are identical.

4. An apparatus according to claim 1 wherein said first interface and said second interface each are designated by a port identifier, said port identifiers uniquely designating said interfaces.

5. An apparatus according to claim 1 wherein each said service translation layer is compliant with the streams specification.

6. An apparatus according to claim 4 wherein said core maintains a switching table, said switching table linking one port ID and path ID combination with another.

7. An apparatus comprising:

first interface capable of sponsoring a first protocol;

a first service translation layer converting data formatted in said first protocol into streams, said first service translation layer extracting and appending a first path identifier to said streams;

a core responsive to said first service translator for obtaining said streams and determining a second path identifier there from, said core transferring said streams according to said second path identifier, the core capable of creating additional new third path identifier;

a second service translation layer accepting said transferred streams, said second service translation layer converting said transferred streams into data formatted according to a second protocol; and a second interface for asserting said data formatted into said second protocol.

8. An apparatus according to claim 7 wherein said first protocol and said second protocol are different.

9. An apparatus according to claim 7 wherein said first and second protocols are identical.

10. An apparatus according to claim 7 wherein said first interface and said second interface each are designated by a port identifier, said port identifiers uniquely designating said interfaces.

11. An apparatus according to claim 7 wherein each said service translation layer is compliant with the streams specification.

12. An apparatus according to claim 10 wherein said core maintains a switching table, said switching table linking one port identifier and path identifier combination with another.

13. An apparatus comprising:

a first interface;

a first service translation layer to convert data formatted in a first protocol into data streams, said first service translation layer to append a first path identifier to said data streams;

a core in communication with said first service translation layer, said core to receive said data streams and determine a second path identifier therefrom, said second path identifier being used to transfer said data streams;

a second service translation layer to receive said transferred data streams and to convert said transferred data streams into data formatted in a second protocol; and a second interface to output said data formatted in said second protocol.

14. An apparatus according to claim 13 wherein said first protocol and said second protocol are different.

15. An apparatus according to claim 13 wherein said first interface and said second interface each are designated by a port identifier, said port identifiers uniquely designating said interfaces.

16. An apparatus according to claim 15, wherein the port identifiers are assigned when said first and second translation service layers are programmed.

17. An apparatus according to claim 15, wherein the port identifiers are assigned through handshaking signaling between said core and said service translation layers.

18. An apparatus according to claim 15 wherein said core maintains a switching table, said switching table linking one port identifier and path identifier combination with another.

* * * * *